Feb. 1, 1938.   J. D. KLEINKAUF ET AL   2,107,155
RADIO DIRECTIONAL INDICATOR
Filed July 27, 1935   2 Sheets-Sheet 1
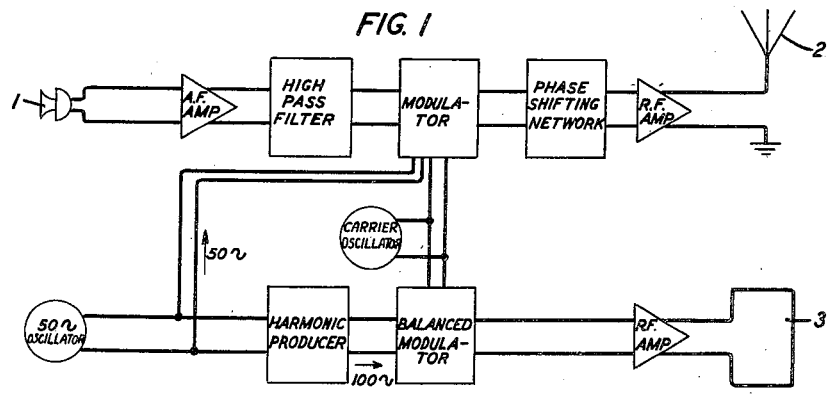
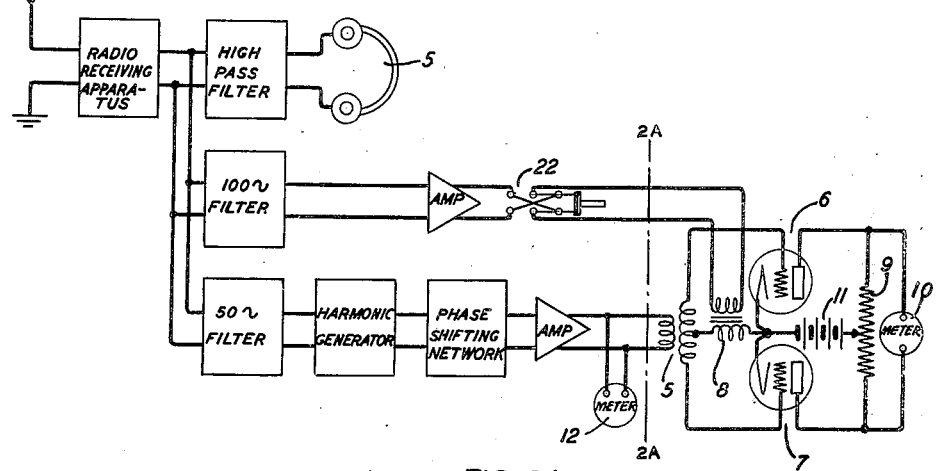
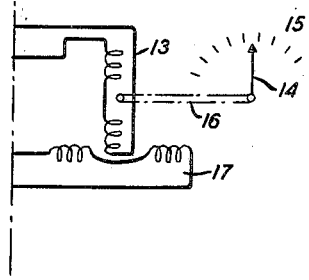
INVENTORS J. B. KLEINKAUF
D. K. MARTIN
BY  E. V. Griggs
ATTORNEY

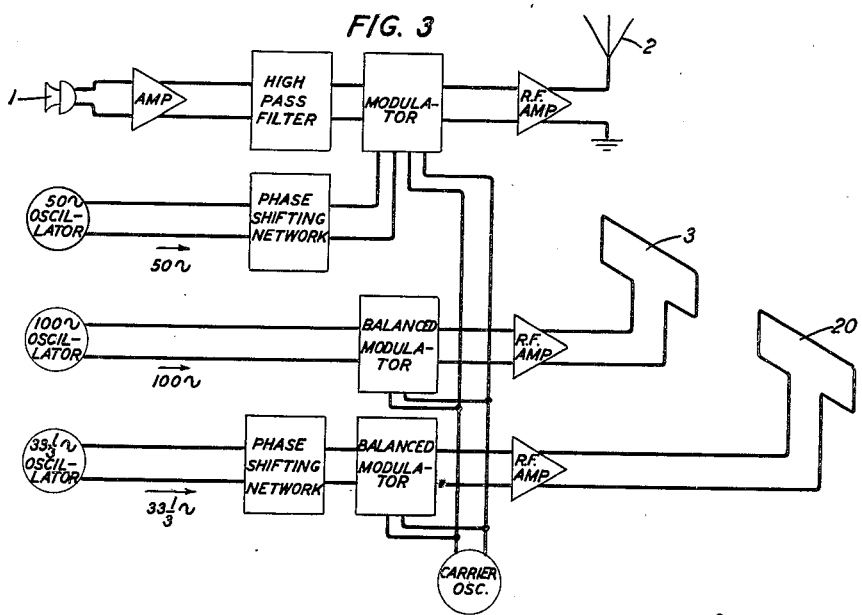
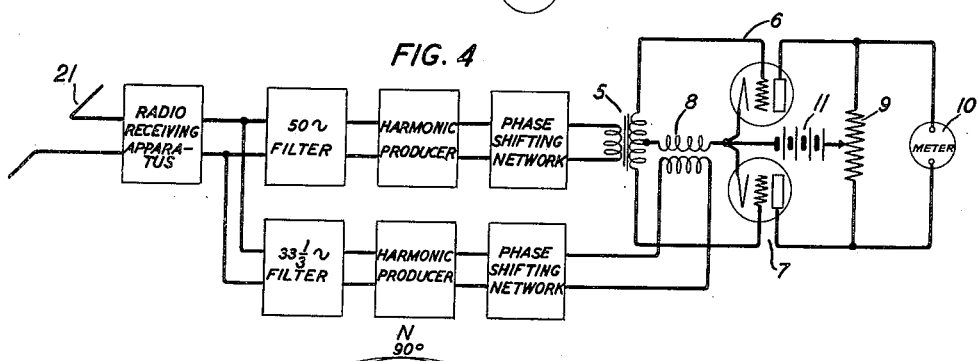
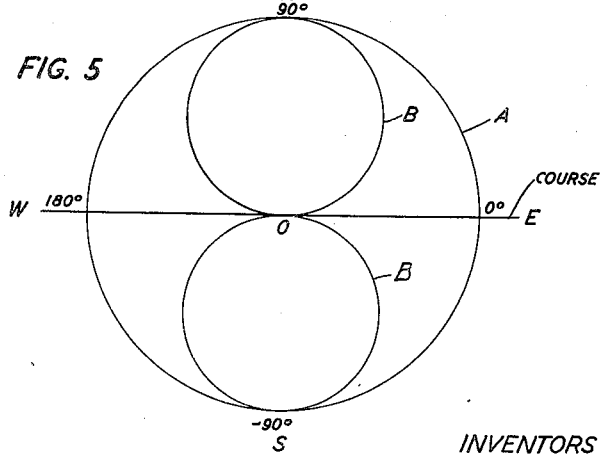
INVENTORS J. B. KLEINKAUF
D. K. MARTIN
BY E. V. Griggs
ATTORNEY Patented Feb. 1, 1938

2,107,155

UNITED STATES PATENT OFFICE 2,107,155

RADIO DIRECTIONAL INDICATOR

James D. Kleinkauf, East Orange, and De Loss K. Martin, West Orange, N. J., assignors to Bell Telephone Laboratories, Incorporated, New York, N. Y., a corporation of New York Application July 27, 1935, Serial No. 33,458

8 Claims. (Cl. 250—11)

This invention relates to a radio directional indication and more particularly to a radio navigational system and method.

An object of this invention is to indicate on a mobile body the position of the body with respect to a predetermined fixed geographical point.

A more particular object of this invention is to provide a radio course over which an airplane may travel.

To ascertain the location of a movable body with respect to some fixed point has long been a most fundamental problem. From earliest time the desire of man to conquer new fields, blaze new trails or seek new surroundings has led to devising sundry means to determine his location in his wanderings. The compass, telescope and sextant have all played and still do play their part in the development of transportation. With the advent of the airplane, this problem has become especially acute. The rapid speed of the airplane together with the desire to maintain schedules in air transportation in spite of foggy weather have contributed to accelerate the development of guiding systems. Perhaps the most satisfactory of these systems is the radio beacon located on the runway of an airport.

One of the desirable features of a radio beacon to be used on an airport runway is that the indication given the pilot in the airplane should be visual. Another is that the antenna system employed should be of convenient size and characteristics to permit installation in an underground pit or on a truck. Another desirable characteristic is that the system be capable of projecting a course in any direction. Finally, the beacon should be preferably of the two course type without any course crossing.

This invention inherently possesses these desirable features. In accordance with the invention a directional indication is derived from a radio beacon from the comparison of the phase of two or more transmitted signals. One of the signals as transmitted from the beacon has a particular directional characteristic while the other has a different directional characteristic. Alternately, the other signal may be non-directional. The signals are produced by modulating a single radio frequency current with two or more low frequency or audio-frequency currents harmonically related to each other. The carrier or radio frequency current together with the side-bands of one of the low frequency currents comprises one of the signals, while the side-bands produced by the other low frequency current comprise the other signal. The carrier and the two side-bands transmitted as one signal combine in a receiving unit on the airplane or other mobile body to reproduce the first low frequency current. The phase of this low frequency current is dependent on the direction of the receiving station from the transmitting station. The carrier and the side-bands from the second low frequency current combine in the receiving unit to reproduce the second low frequency current. The phase of this latter low frequency signal is independent of the direction if it is derived from the side-bands and carrier of the non-directional signal from the radio beacon. By converting one of these low frequency signals, preferably by producing a harmonic of it, to a current of the frequency the same as the other low frequency signal and comparing the relative phases of the two currents, the direction of the airplane from the beacon is determined.

A more comprehensive understanding of this invention is obtained by reference to the accompanying drawings in which:

Fig. 1 is a schematic diagram of a radio system for transmitting signals in accordance with this invention.

Fig. 2 shows schematically a system for the reception of signals transmitted by the system shown in Fig. 1;

Fig. 2A is a schematic diagram of a different type of indicating device that may be employed on the receiving system of this invention instead of that shown in Fig. 2;

Fig. 3 is a schematic diagram of a radio transmitting system by means of which a mobile body, such as an airplane, in addition to obtaining a directional bearing may be guided by means of beacon signals at the proper angle to an airport runway;

Fig. 4 shows schematically the reception system employed in conjunction with the transmitting system shown in Fig. 3 and Fig. 5 is a polar diagram of the antenna employed in the system shown in Fig. 1.

Fig. 1 illustrates a system adapted for the simultaneous transmission of beacon and radio telephone signals. Voice frequency signals pass from a transmitter or microphone 1 to an audio-frequency amplifier indicated by a labelled block diagram in the drawings. The amplified signals pass through a high-pass filter to a modulator in which the amplified voice frequency currents modulate a radio frequency current supplied by a carrier oscillator.

The high-pass filter is of a type which is capable of substantially eliminating audio frequency currents below the highest audio beacon frequency. This type of filter prevents the modulation of the radio frequency carrier current by components of speech having the same frequency as that of any of the beacon signals. The modulation products pass through a phase shifting network to a radio frequency amplifier. The radio telephone signals are radiated by means of a non-directional antenna 2.

A 50-cycle audio-frequency current is generated by a 50-cycle oscillator. One of the paths from the 50-cycle oscillator leads to the modulator, while another path is led to a harmonic producer. The harmonic producer is adjusted to produce a current having a frequency of 100 cycles from the 50-cycle current supplied to it. The 100-cycle current modulates in a balanced modulator the radio frequency current supplied from the carrier oscillator. Other means which produce one or both side-bands of the 100-cycle current and which substantially suppress the carrier may be employed instead of the balanced modulator. The modulation products from the balanced modulator pass through a radio frequency amplifier and are radiated by a directonal antenna 3.

The 50-cycle current supplied to the modulator modulates the radio frequency current supplied by the carrier oscillator. The modulation products are supplied to a phase shifting network. The phase shifting network is adusted to obtain any desired phase of the 50-cycle side-bands together with the carrier. From the phase shifting network the signals comprising the radio frequency current together with the side-bands of the 50-cycle current pass through a radio frequency amplifier and are radiated by the antenna 2. The audio-frequency amplifier, the high-pass filter, the modulator, the phase shifting network, the radio frequency amplifier associated with the modulator, the 50-cycle oscillator, the radio frequency amplifier associated with the balanced modulator, the carrier oscillator, the harmonic producer and the balanced modulator are indicated in labelled block diagrams in the drawings.

The carrier and 50-cycle side-bands are transmitted from the non-directional antenna 2, while the 100-cycle side-bands only are transmitted from the directional antenna 3. Radio telephone messages are transmitted by means of the microphone 1 in a well-known manner and are radiated from the non-directional antenna 2. The carrier and 50-cycle side-bands combine in a receiver to reproduce a 50-cycle audio frequency current, the time phase of which is independent of the direction of the receiving antenna from the transmitting antenna. The unmodulated carrier component radiated from the non-directional antenna and the 100-cycle side-bands radiated from the loop combine in a receiver to reproduce a 100-cycle audio frequency current. As hereinafter explained, the phase of the side-bands radiated by the loop differs on one side of the course by 180 degrees from that on the other. As the receiving antenna moves from one side of the course to the other, the phase of the 100-cycle side-band signal impressed on a receiving antenna reverses 180 degrees. Since the phase of the carrier radiated by the non-directional antenna is the same on both sides of the course, the phase of the 100-cycle current obtained by combining the carrier and 100-cycle side-bands in the receiving system reverses when the antenna moves from one side of the course to the other.

Fig. 2 illustrates a receiving system employed in conjunction with the transmitting system shown in Fig. 1. The receiving system comprises a vertical antenna 4 and a radio receiving apparatus indicated by the labelled block diagram in the drawings. The radio receiving apparatus may be of any well-known type which is capable of reproducing 50 and 100-cycle audio frequency currents. Preferably the apparatus is of the type which also reproduces telephonic messages. Three paths are connected to the output of the radio receiving apparatus. One path passes through a high-pass filter to a telephone receiver or loud-speaker 5 for the reproduction of telephonic messages transmitted by the system shown in Fig. 1. The high-pass filter is of a type which is capable of passing audio frequencies above the highest beacon audio frequencies. In the specific embodiment illustrated in Fig. 2, the high-pass filter has a cut-off above 100 cycles so that the beacon signals are not reproduced in the receiver 5.

The carrier and 50-cycle side-bands transmitted from the non-directional antenna 2 in Fig. 1, combine in the radio receiving apparatus to reproduce a 50-cycle current. This 50-cycle current is separated by means of a 50-cycle filter. The 50-cycle filter may be a band-pass filter, a low-pass filter with cut-off between 50 and 100 cycles or a simple tuned circuit capable of passing a 50-cycle audio frequency current and substantially preventing the passage of 100-cycle current. Any of filters may include electrical or mechanical resonant elements. The 50-cycle current is led to a harmonic generator which produces the second harmonic of the 50-cycle audio-frequency current. The second harmonic passes through a phase shifting network to an amplifier. The phase shifting network compensates for phase shifts which occur in the receiving apparatus and other circuit elements. From the output of the amplifier, the amplified second harmonic of the 50-cycle current passes through a transformer 5 to the input of a balanced modulator circuit comprising two space discharge devices 6 and 7 connected in push-pull relation. The carrier and 100-cycle side-bands reproduce a 100-cycle audio-frequency current in the output of the receiving apparatus.

A path for obtaining the 100-cycle current passes through a 100-cycle filter through an amplifier to the primary of a transformer 8. Like the 50-cycle filter, the 100-cycle filter may be a band-pass filter, a high-pass filter with cut-off between 50 and 100 cycles or a simple tuned circuit. The secondary winding of the transformer 8 is connected to the common path of the input circuit of devices 6 and 7. A resistance 9 is connected between the anodes of space discharge devices 6 and 7. Connected in parallel with the resistance 9, a zero center type of milliammeter indicates a difference in phase between the 100-cycle current supplied to the transformer 5 and that supplied to the transformer 8. Space current for devices 6 and 7 is supplied by a unidirectional source 11 through portions of the resistance 9. An alternating current voltmeter 12 is bridged across the path between the amplifier and the transformer 5. The meter 12 indicates the amplitude of signals received from the non-directional antenna 2, shown in Fig. 1. The apparatus comprising transformers 5 and 8 and space discharge devices 6 and 7 is of the balanced modulator type well-known to those skilled in the art and indicates differences in phase between the 100-cycle audio-frequency current derived from the signals transmitted by the non-directional antenna 2 and those derived from the directional or loop antenna 3 of Fig. 1. The high pass filter, the 100 cycle filter, the amplifier connected to the 100 cycle filter, the 50 cycle filter, the harmonic generator, the phase shifting network and the amplifier connected to the network are indicated in labelled block diagrams in the drawings.

Instead of the comparator of the balanced modulator type shown in Fig. 2, a dynamometer type meter may be employed. This type of meter is shown schematically in Fig. 2A. The dynamometer type of meter is connected to the system shown in Fig. 2 along the line 2A—2A thereof. The dynamometer shown in Fig. 2A comprises a stationary winding 17 and a rotating winding 13. Fixedly attached to the rotating winding 13 by means of a shaft 16 is a drum or pointer 14. A scale 15 indicates the rotation of the drum or pointer 14. One of the 100-cycle audio frequency currents is supplied to the stationary winding 17, while the other is supplied to the rotating winding 13. A difference in the phase between the two currents is indicated by the scale 15. Whether the balanced modulator or the dynamometer type of phase comparator is employed, there is a deflection in one direction when the two 100-cycle currents are in phase and in the opposite direction when they are out of phase. A manually operated switch 22 is employed when desired to reverse the polarity of the 100-cycle audio frequency current supplied to the transformer 8 of the balanced modulator indicator or the coil 13 of the dynamometer shown in Fig. 2A.

The phase shifting network is adjusted so that the two 100-cycle currents are in phase when the receiver is on one side of the course, while they are in opposite phase when the receiver moves to the other side of the course. Improper adjustment of the phase-shifting network does not destroy the directional indication so long as the two 100-cycle currents are less than 90 degrees out of phase, since, for any phase separation less than 90 degrees, there remains an in-phase component of the 100-cycle currents. This component reverses as the receiver passes from one side of the course to the other. The result of improper adjustment is merely to decrease the magnitude of the deflection, and thereby to produce a lesser sharpness of course indication. Accordingly, improper adjustment of the phase shifting network does not prevent correct directional indication by the meter 10 or the dynamometer.

Fig. 5 illustrates polar diagrams of the two antennae employed in the system shown in Fig. 1. A represents the polar diagram of the non-directional antenna 2, while B is a polar diagram of the directional antenna 3. The antennae 2 and 3 are located at a point 0. The polar diagram of the directional antenna 3 comprises two adjacent lobes. The signal radiated from the directional antenna 3 represented by one lobe of the polar diagram is displaced in time phase by 180 degrees or $\pi$ radians from the signal represented by the other lobe. If a beacon course is desired which extends from east to west, the antenna 2 is situated at the point 0 so that the minimum of the polar diagram which occurs between the two lobes coincides with the east-west course desired. Accordingly, a reversal in phase of the waves emitted by the directional antenna 3 which are impressed on the receiving antenna occurs when the receiving antenna is moved from the north side of the course to the south side of the course, or vice versa. If the side-bands resulting from the modulation of the carrier by the audio frequency current are recombined with the carrier in a detector, the audio frequency current is reproduced, and if the phase of the side-bands is reversed before recombining, the reproduced audio frequency current is also reversed in phase.

The carrier and 50-cycle side-bands are transmitted from the non-directional antenna 2. The directive pattern of the loop 3 consists of two lobes in which the phase of the radiated wave differs by 180 degrees. The 100-cycle side-bands are transmitted from the loop 3. The carrier and 50-cycle side-bands combine in a receiver to reproduce a 50-cycle audio frequency current, the time phase of which is independent of the direction of the receiving antenna from the transmitting antenna. As previously explained the carrier radiated from the non-directional antenna and the 100-cycle side-bands radiated from the loop combine in the receiving apparatus to reproduce a 100-cycle current, the phase of which reverses 180 degrees at the minimum of the loop directive pattern. The 50-cycle audio frequency current is separated by means of the 50 cycle filter, its second harmonic is produced and amplified to provide a 100-cycle audio-frequency current, the time phase of which is employed as a standard of comparison in the receiving system. The phase of this latter 100-cycle frequency current is compared with that reproduced from the signal transmitted by the loop. The phase shifting means shown in Fig. 2 compensates for phase shifts which occur in the receiving apparatus and other circuit elements. When the antenna 4 of the receiving apparatus deviates to the north side of the course, shown in Fig. 5, the 100-cycle current reproduced from the signal transmitted from the loop is in phase with the 100-cycle current derived from the non-directional transmission. If an airplane or other mobile object upon which the receiving system, shown in Fig. 2, is located, deviates to the south side of the course which lies along the loop minimum, these two 100 cycle currents are out of phase. The relative phase of the two currents is indicated by a pointer or a meter 10 shown in Fig. 2 or the pointer and scale 14 and 15 of the dynamometer type of indicator shown in Fig. 2A. When the receiving antenna is on course or lies in the east-west line of Fig. 5, no signal from the directional antenna is impressed upon the receiving antenna. Therefore, no difference in potential exists across the meter 10 and the pointer of the meter remains at the zero or On course position. If the dynamometer type of indicator is employed, no current passes through the coil 13 and the pointer 14 likewise remains at the zero or On course position.

The indicating meter may be marked On course at the zero center position, Right on the right-hand side, and Left on the left-hand side. If it is desired that an airplane having the receiving system shown in Fig. 2 travel along the course shown in Fig. 5 from west to east, the meter 10 or the dynamometer is connected in a manner such that the pointer deflects to "right" when the airplane deviates to the south side of the course, and to "left" when the airplane deviates to the north side of the course.

If it is desired that the airplane travel along the course from east to west, the polarity of one of the 100-cycle currents may be reversed by operating the switch 22 to a position which is marked "East-west". The pointer deflects to "left" when the airplane deviates to the south of the course and to "right" when the airplane deviates to the north of the course.

The use of a non-directional antenna 2, as shown in Fig. 1, results in a two-course beacon, the indication of which does not reverse when passing over the ground station. The non-directional antenna can be replaced by a directional antenna. If a loop antenna is substituted for the non-directional antenna its maxima lying along the course, the beacon operates in a similar manner except that the indication reverses when passing over the ground station.

In addition to indicating the position on a course of a mobile object such as an airplane, the system shown in Figs. 3 and 4 guides an airplane or other mobile object at the proper angle when landing on an airport runway. Fig. 3 is a block diagram of the transmitting system of the beacon including the angular guiding feature.

The course directional indication system shown in Fig. 3 is substantially the same as that shown in Fig. 1. Sidebands of a 100-cycle audio frequency current are radiated from the loop or directional antennae 3. The apparatus and principle of operation is similar to that shown in Fig. 1 except that the 100-cycle current is derived from a 100-cycle oscillator. The modulation products of the 50-cycle audio frequency current and radio frequency current supplied by the carrier oscillator in addition to radio telephone signals are radiated from the non-directional antenna 2. The apparatus employed for these latter purposes is the same as that shown in Fig. 1 except that preferably the phase shifting network is located between the 50-cycle oscillator and the modulator instead of between the modulator and radio frequency amplifier. The principle of operation of the system shown in Fig. 3 for radiating the 50-cycle beacon and telephone signals is the same as that shown in Fig. 1.

The angular guiding system comprises an antenna array 20 and apparatus for radiating beacon signals therefrom. Guidance of the airplane in a horizontal plane is accomplished by using the horizontal directive pattern of an array of vertical transmitting antennae, as received through the medium of a vertical receiving antenna. In the same way, guidance of the airplane in a vertical plane may be accomplished by using the vertical directive pattern of an array of horizontal transmitting antennae, and a horizontal receiving antenna. The antenna 20 is oriented so that the minimum at which a phase reversal occurs is tilted at an angle from the earth suitable for guiding an airplane to earth at a point at which the antenna array 20 is located. A 33⅓-cycle current is derived from a 33⅓-cycle oscillator. The 33⅓-cycle current passes through a phase shifting network to a balanced modulator supplied with radio frequency current by the carrier oscillator. The 33⅓-cycle side-bands pass through a radio frequency amplifier and are radiated from the antenna array 20. Preferably, the 33⅓-cycle, 50 cycle and 100 cycle currents are obtained by driving three alternating current generators synchronously related by means of a common shaft or gears. The various oscillators, amplifiers, modulators, filter, and phase shifting networks are indicated by labelled block diagrams in the drawings.

In addition to the receiving system shown in Fig. 2 for indicating the course direction, a system located on the mobile body indicates the angle at which the mobile object is approaching the antenna array 20 shown in Fig. 3. This reception system for the determination of the guiding angle is shown in the labelled block diagram of Fig. 4. The beacon signals radiated from the antenna array 20 of the transmitting system shown in Fig. 3 are impressed upon a horizontal antenna 21. The carrier and 50-cycle side-bands of the non-directional antenna and the carrier and 33⅓-cycle side-band combine in a receiver apparatus to reproduce a 33⅓-cycle audio-frequency current and a 50-cycle audio-frequency current. The 33⅓-cycle audio-frequency current is separated by means of the 33⅓-cycle filter. The third harmonic of the 33⅓-cycle audio-frequency current is produced by a harmonic producer. The resulting 100-cycle current passes through a phase shifting network to the input of a transformer 8. The 50-cycle audio-frequency current in the output of the radio receiving apparatus is separated by a 50-cycle filter. The second harmonic of the resulting 50-cycle current is derived by means of a harmonic producer. The 100-cycle current produced by this latter means passes through a phase shifting network to the input of transformer 5. The relative phase of the resulting two 100-cycle audio-frequency currents is compared in a phase comparator similar to that shown in Fig. 2. The principle of operation of the comparator is the same as that shown in Fig. 2. The angle at which a mobile object approaches the antenna 20 is indicated by the meter 10. The two phase shifting devices shown in Fig. 4 are employed to compensate for phase shifts which occur in the receiving apparatus and other circuit elements. The beacon signals radiated from antenna 2 and 3 of Fig. 3 and the radio telephone signals radiated from antenna 2 of Fig. 3 are translated by the system shown in Fig. 2 for course indication and the communication of intelligence.

While preferred embodiments of this invention have been illustrated and described, various modifications therein may be made without departing from the scope of the appended claims.

What is claimed is:

1. The method which comprises transmitting non-directional carrier waves from a beacon station modulated by a low frequency wave and simultaneously transmitting from the same station a beam of directional carrier waves having fixed directivity in such direction as to emit substantially no energy of the directional waves along a definite course and directional energies of opposite phases on opposite sides of the course and deriving an indication of the relative position of a point in space with respect to the beacon station solely by interaction at the point, of the low frequency modulation component of the non-directional received waves with energy of the beam of directional waves received at the point.

2. The method of directional indication comprising transmitting a non-directional carrier wave modulated by a particular low frequency current from a beacon station and simultaneously transmitting from the same station a beam of directional carrier waves modulated by a second low frequency current harmonically related to said first low frequency current, said beam of directional waves having fixed directivity in such direction as to emit substantially no energy of the directional waves along a definite course and directional energies of opposite phases on opposite sides of the course and deriving an indication of the relative position of a point in space with respect to the beacon station solely by interaction at the point, of the low frequency component obtained by demodulation of the non-directional received wave with the low frequency component obtained by demodulation of the directional wave received at the point.

3. The method of directional indication comprising transmitting from a point a non-directional carrier wave modulated by a particular low frequency current and simultaneously transmitting from the same point a bilaterally and oppositely-phased directional carrier wave modulated by a second low frequency current harmonically related to said particular low frequency current, aligning the null direction of transmission of said directional carrier wave along a definite course whereby energies of opposite phases will be transmitted on opposite sides of said course and deriving an indication of the relative position of a receiving point with respect to said transmitting point solely by interaction at the receiving point of the low frequency component obtained by demodulation of the non-directional received wave with the low frequency component obtained by demodulation of the directional wave received at said receiving point.

4. In a radio direction indicating system, means for transmitting a non-directional carrier wave modulated by a particular low frequency current, means for simultaneously transmitting bilaterally a second carrier wave modulated by a second low frequency current harmonically related to said particular low frequency current, said second carrier wave being oppositely-phased on opposite sides of the definite course along which the null direction of transmission of said second carrier wave is directed, means for receiving and demodulating said carrier waves and converting one of said low frequency components to the frequency of the other, and means actuated solely by said two low frequency components converted to the same frequency to indicate the direction of the transmitting point from the receiving point.

5. In a radio direction indicating system, means for transmitting a non-directional carrier wave modulated by a particular low frequency current, means for simultaneously transmitting bilaterally a second carrier wave modulated by a second low frequency current harmonically related to said particular low frequency current, said second carrier wave being oppositely phased on opposite sides above and below the definite course along which the null direction of transmission of said second carrier wave is directed, said definite course being inclined with respect to a landing field at an angle suitable for the descent of aircraft in landing on said field, means for receiving and demodulating said carrier waves and converting one of said low frequency components to the frequency of the other and means actuated solely by said two low frequency components converted to the same frequency to indicate the position of said receiving point with respect to said transmitting point and to said definite inclined course.

6. In a radio direction indicating system, means for transmitting a non-directional carrier wave modulated by a particular low frequency current, means for simultaneously transmitting bilaterally a plurality of carrier waves each being modulated by a different low frequency current harmonically related to said particular low frequency current, said plurality of carrier waves being oppositely phased on opposite sides of a like plurality of definite courses along which the null directions of transmission of said plurality of carrier waves are respectively directed, means for receiving and demodulating said carrier waves and converting each of said plurality of low frequency currents to the frequency of the particular low frequency current, and means actuated solely by said particular low frequency component and each of the said plurality of low frequency components converted to the same frequency, taken severally, to provide a like plurality of independent indications of the direction of the transmitting point from the receiving point and from each of said plurality of courses.

7. A radio direction indicating system comprising means for transmitting a non-directional carrier wave modulated by a particular low frequency current, means for simultaneously transmitting bilaterally a second and a third carrier wave, said second and third waves each being modulated by a different low frequency current, both said low frequency currents being harmonically related to said particular low frequency current, said second carrier wave being oppositely phased on opposite sides of the definite horizontal course along which the null direction of transmission of said second carrier wave is directed, said third carrier wave being oppositely phased on opposite sides above and below a definite course inclined to the horizontal at a convenient angle for aircraft to approach and leave a landing field on which said course indicating apparatus is located, said inclined course intersecting said horizontal course, means for receiving and demodulating said carrier waves and for severally converting each of said different low frequency currents to the frequency of said particular current, means actuated solely by the converted low frequency current derived from said second modulated carrier wave and said particular low frequency current derived from said non-directional carrier wave to indicate the horizontal direction of the transmitting point from the receiving point and means actuated solely by the converted low frequency current derived from said third modulated carrier wave and said particular low frequency current derived from said non-directional carrier wave to indicate the direction along the inclined course of the transmitting point from the receiving point.

8. The method of directional indication comprising transmitting a non-directional carrier wave modulated by a particular low frequency current from a beacon station and simultaneously transmitting from the same station a plurality of beams of directional carrier waves each of said latter waves being modulated by different low frequency currents harmonically related to said first low frequency current, each of said plurality of beams of directional waves having fixed directivity in such direction as to emit substantially no energy of the directional waves along a definite course and directional energies of opposite phases on opposite sides of the course, each of said plurality of directional waves being directed along a different course and deriving severally a plurality of independent indications of the relative position of a point in space with respect to the beacon station solely by the several interaction at the point of the low frequency component obtained by demodulation of the non-directional received wave with each of the low frequency components obtained by demodulation of the directional waves received at the point.

JAMES D. KLEINKAUF.
DE LOSS K. MARTIN.